(12) United States Patent
Tai

(10) Patent No.: US 6,795,604 B2
(45) Date of Patent: Sep. 21, 2004

(54) OPTICAL SWITCH

(75) Inventor: Shu-Lin Tai, Tu-Chen, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 181 days.

(21) Appl. No.: 10/234,572

(22) Filed: Sep. 3, 2002

(65) Prior Publication Data

US 2004/0042709 A1 Mar. 4, 2004

(51) Int. Cl.[7] ............................. G02B 6/26; G02B 6/42; G02B 6/34
(52) U.S. Cl. .............................. 385/22; 385/25; 385/36
(58) Field of Search .............................. 385/15, 16, 18, 385/25, 26, 36, 39, 47, 22

(56) References Cited

U.S. PATENT DOCUMENTS 4,378,144 A * 3/1983 Duck et al. .................... 385/16
5,546,180 A * 8/1996 Garel-Jones et al. ........ 356/73.1
5,781,672 A * 7/1998 Cutts ............................ 385/22

* cited by examiner

*Primary Examiner*—Edward J. Glick
*Assistant Examiner*—Thomas R Artman
(74) *Attorney, Agent, or Firm*—Wei Te Chung

(57) ABSTRACT

An optical switch (10) includes an input device (11), a reflection output device (12), a transmission output device (13), a prism (2) and a rotation device (3). The input and reflection output devices are rotatable around the prism between a first position and a second position. The prism has a reflective surface (21) to effect optical switching. When the input and reflection output devices are at a first position, an input light beam from the input device passes through the reflective surface of the prism, and is output through the transmission output device. When the input and reflection output devices are at a second position, the input light beam from the input device is incident on the reflective surface of the prism at an angle which is equal to or larger than a critical angle of the prism. The input light beam is totally reflected by the reflective surface of the prism and is output through the reflection output device.

28 Claims, 9 Drawing Sheets

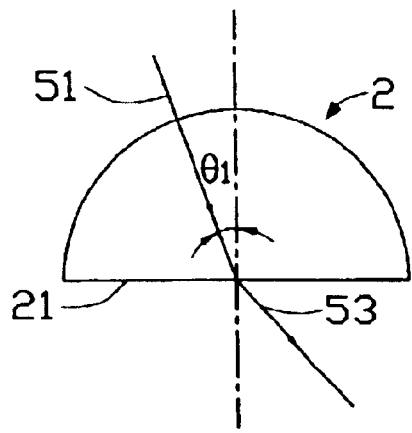
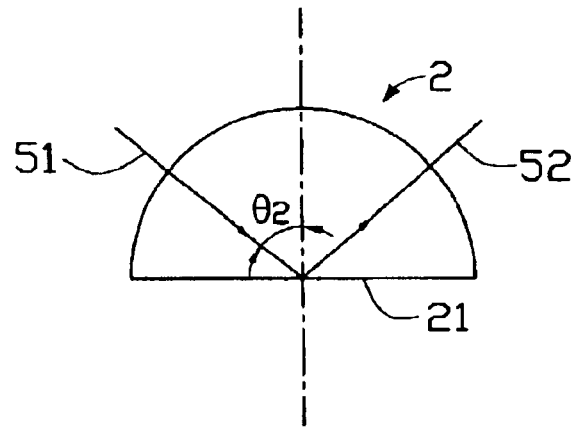
FIG. 3A                FIG. 3A
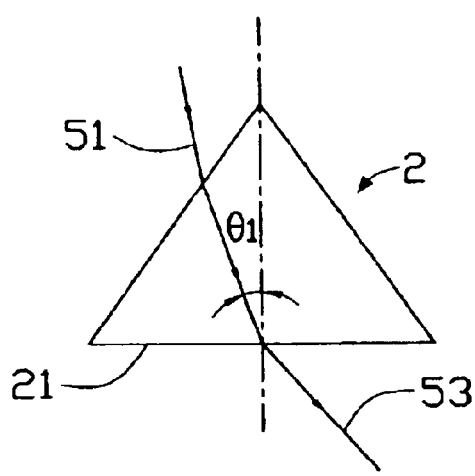
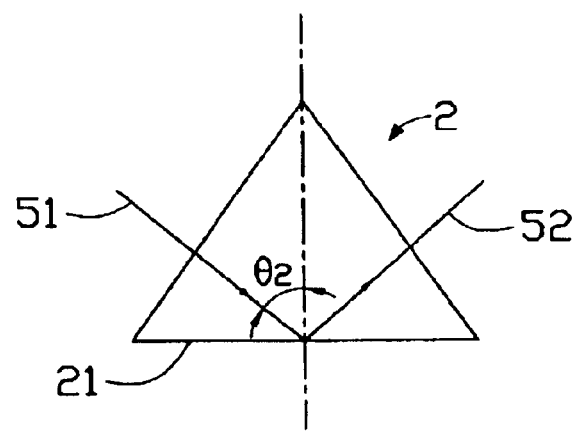
FIG. 4A                FIG. 4B

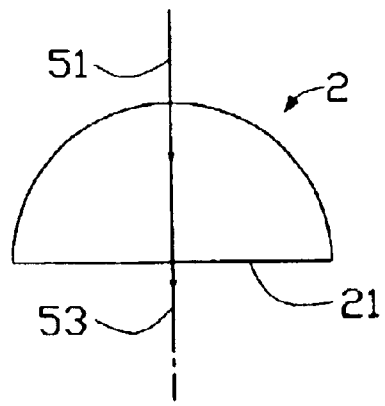 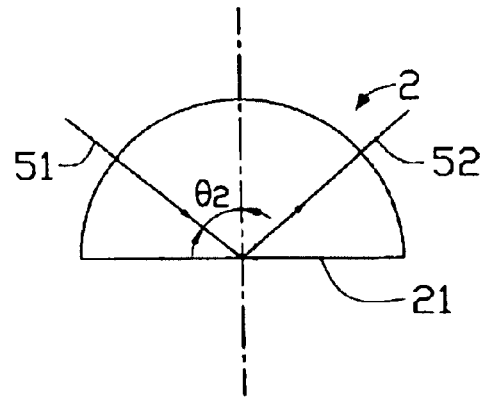
FIG. 7A  FIG. 7B
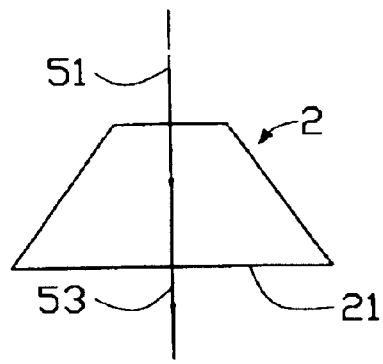 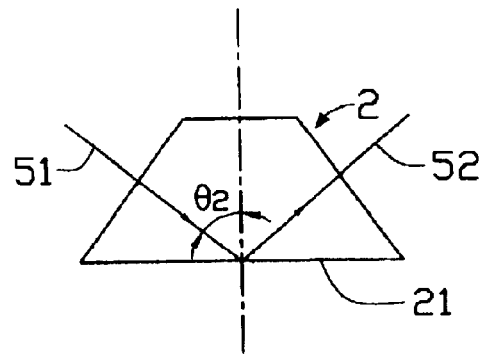
FIG. 8A  FIG. 8B

OPTICAL SWITCH

BACKGROUND OF THE INVENTION

1. Field of the Invention

The present invention relates to optical switches used in fiber communication and optical network technology, and particularly to a mechanical optical switch with a prism as a switch element.

2. Description of Prior Art

For purposes of convenience and economy, it is often desirable to employ switches in optical networks, so that either a single optical signal can be shared between two or more users or a single user can choose from a variety of optical signals without the added expense and complexity of installing additional hardware.

Optical switches can be classified as mechanical optical switches or as non-mechanical optical switches. Mechanical optical switches realize changes in lightpaths by moving optical fibers or elements using principles of mechanics or electromagnetism.

Referring to FIGS. 9A and 9B, U.S. Pat. No. 6,154,586 discloses an optical switch 99 which, in a first state, reflects an input light beam from an input port 82 to a reflection output port 83, and in a second state, transmits an input light beam from the input port 82 to a transmission output port 84. The optical switch 99 further comprises a block 81 made of a light transparent substrate, which has a reflective surface 811. A reflective cavity 86 and a transmissive cavity 87 are defined in the block 81, and are spaced by a light transparent diaphragm 85. The reflective cavity 86 and the transmissive cavity 87 are respectively filled with a reflective and transmissive fluid. The optical switch 99 further comprises an actuator 7 connected with the transmissive cavity 87 by a connecting channel 71. The actuator 7 controls the light transparent diaphragm 85 contacting with or detaching from the reflective surface 811.

Referring to FIG. 9A, the optical switch 99 is at the first state, and the reflective fluid covers the reflective surface 811 of the block 81. The input light beam from the input port 82 is incident on the reflective surface 811 at an angle which is equal to or greater than a critical angle determined by the refractive indices of the reflective surface 811 and the reflective fluid of the reflective cavity 86. The light beam is totally reflected to the reflection output port 83. Referring to FIG. 9B, the optical switch 99 is at the second state, and the transparent diaphragm 85 contacts with the reflective surface 811. The input light beam from the input port 82 is incident on the reflective surface 811 at an angle which is smaller than a critical angle determined by the refractive indices of the reflective surface 811 and the transparent diaphragm 85. The light beam is transmitted to the transmission output port 84 through the block 81.

However, the optical switch above mentioned has some shortcomings. First, the reflective cavity 86 and the transmissive cavity 87 of the block 81 are filled with fluid. In order to prevent fluid from leaking out of the cavities 86, 87, the block 81 must have good seals, thus increasing the cost of the optical switch. Second, when the transparent diaphragm 85 contacts with the reflective surface 811, residual fluid is unavoidably left between the transparent diaphragm 85 and the reflective surface 811, thus reducing performance of the optical switch.

An improved optical switch having good performance and low cost is desired.

SUMMARY OF THE INVENTION

Accordingly, an object of the present invention is to provide an optical switch having good performance and low cost.

To achieve the above objects, an optical switch in accordance with the present invention comprises an input device, a reflection output device, a transmission output device, a prism and a rotation device. The input and reflection output devices are rotatable around the prism between a first position and a second position. The prism has a reflective surface to effect optical switching. When the input and reflection output devices are at a first position, an input light beam from the input device passes through the reflective surface of the prism, and is output through the transmission output device. When the input and reflection output devices are at a second position, the input light beam from the input device is incident on the reflective surface of the prism at an angle which is equal to or larger than a critical angle of the prism. The input light beam is totally reflected by the reflective surface of the prism, and is output through the reflection output device.

BRIEF DESCRIPTION OF THE DRAWINGS

Other objects, advantages and novel features of the present invention will be drawn from the following detailed description of a preferred embodiment of the present invention with attached drawings, in which:

FIG. 3A and FIG. 3B are diagrams showing two different light paths created by operation of the optical switches of FIGS. 1A, 1B, 2A and 2B having a semi-circular prism therein, wherein the optical switch is respectively at a first state and at a second state;

FIG. 4A and FIG. 4B are diagrams showing two different light paths created by operation of the optical switches of FIGS. 1A, 1B, 2A and 2B having a triangular prism therein, wherein the optical switch is respectively at a first state and at a second state;

FIG. 7A and FIG. 7B are diagrams showing two different light paths created by operation of the optical switch of FIGS. 5A and 5B, the optical switch having a semi-circular prism therein, wherein the optical switch is respectively at a first state and at a second state;

FIG. 8A and FIG. 8B are diagrams showing two different light paths created by operation of the optical switch of FIGS. 5A and 5B, the optical switch having a trapeziform prism therein, wherein the optical switch is respectively at a first state and at a second state.

DETAILED DESCRIPTION OF PREFERRED EMBODIMENT

Figure 1A:
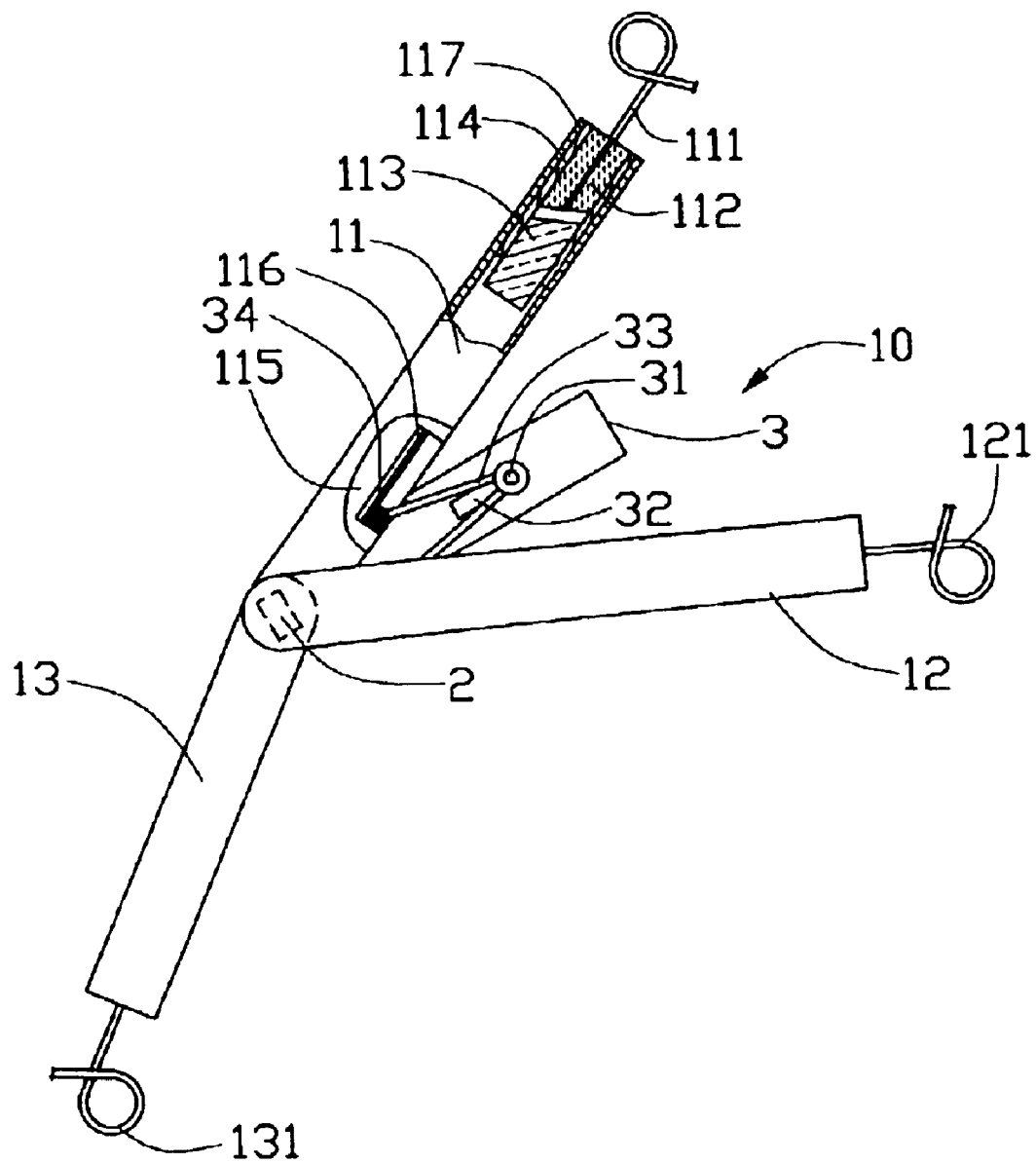
FIG. 1A and FIG. 1B are schematic top views of an optical switch in accordance with a first embodiment of the present invention, partially cut away to shown on interior thereof, wherein the optical switch is respectively at a first state and at a second state.
Figure 1B:
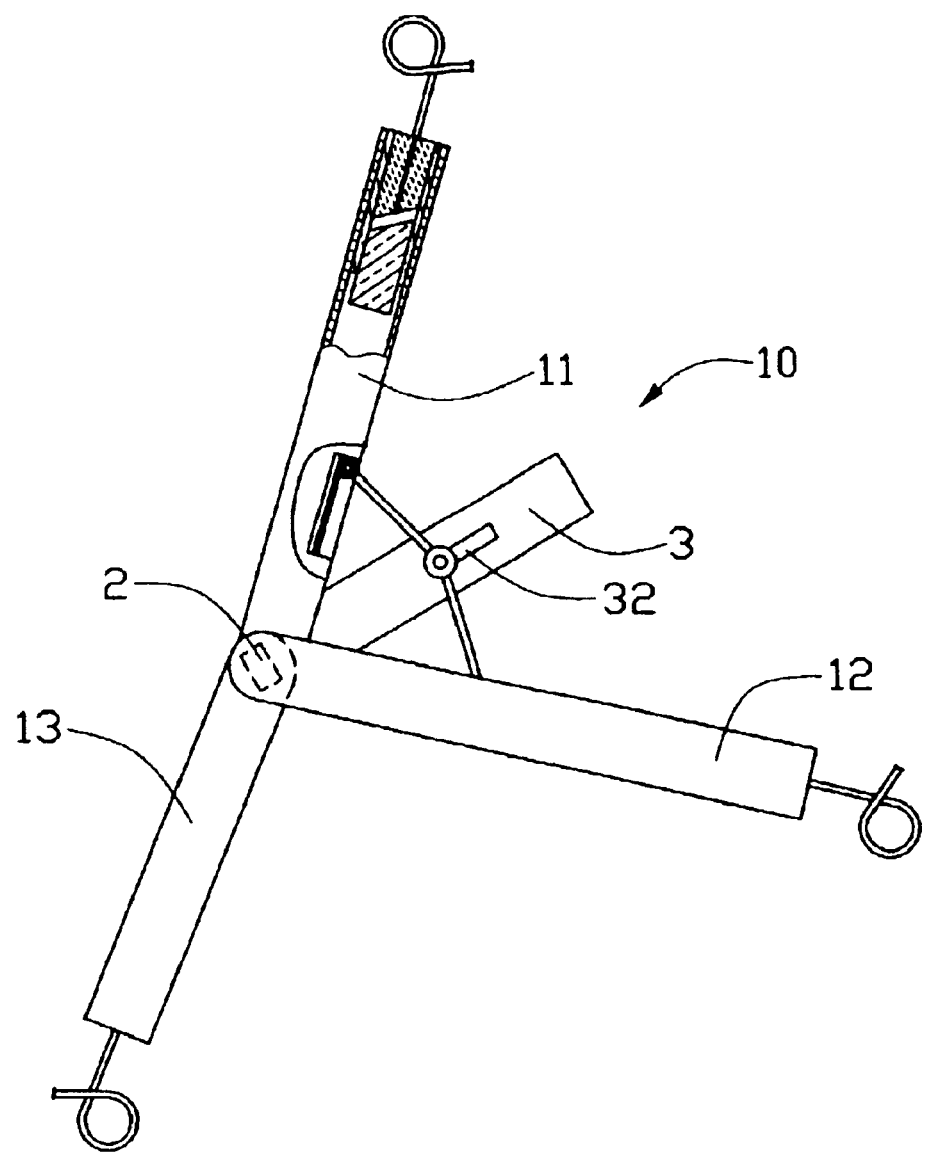

Referring to FIGS. 1A and 1B, an optical switch 10 in accordance with the present invention comprises an input device 11, a reflection output device 12, a transmission output device 13, a prism 2 and a slider 3. The input device 11 is for inputting light signal into the optical switch 10, and the reflection and transmission output devices 12, 13 are for outputting light signals from the optical switch 10. The prism 2 is for switching the light path coming from the input device 11 between the output devices 12, 13. The slider 3 is for controlling the movement of the input device 11 and the reflection output device 12 relative to the prism 2.

The input device 11 and the reflection output device 12 are synchronously rotated between a first position and a second position. When the input device 11 and the reflection output device 12 are rotated to the first position (shown in FIG. 1A), light signals from the input device 11 transmit through the prism 2 to the transmission output device 13. When the input device 11 and the reflection output device 12 are rotated to a second position (shown in FIG. 1B), light signals from the input device 11 are totally reflected to the reflection output device 12 by the prism 2.

The input device 11 comprises a ferrule 112 with an input optical fiber 111 fixed therein, and a collimator 113 collimating the input light from the input optical fiber 111. The collimator 113 can be a GRIN lens or a molded lens. In order to reduce return insertion losses, one end surface of the ferrule 112 is ground flat at an angle of 6–8 degrees from a hypothetical plane constructed normal to a longitudinal center line of the ferrule 112, and is parallel with a facing end surface of the collimator 113. The ferrule 112 and the collimator 113 are fixed in a quartz tube 114, and a portion of the collimator 113 extends from the quartz tube 114. A metal tube 117 is assembled over the quartz tube 114 to protect the quartz tube 114. A plate 115 is attached to an outside surface of the metal tube 117 of the input device 11. A recess (not shown) is formed at a side of the plate 115, and a rack 116 is located at the recess of the plate 115 for meshing with a gear 34 of the slider 3.

The reflection output device 12 is substantially a mirror image of the input device 11, and comprises a reflection, output optical fiber 121. The reflection output device 12 is slight larger than the input device 11 for assembling the two ports 11, 12 at one point. The reflection output device 12 also has a plate 115 and a rack 116 attached thereof. The reflection output device 12 and the input device 11 are symmetrically located at two sides of the slider 3. The transmission output device 13 with a transmission output optical fiber 131 is almost identical to the input device 11, but the transmission output device 13 doesn't have the plate and rack attached thereon. The transmission output device 13 is fixed, and a predetermined angle is defined between a center axis of the slider 3 and a center axis of the transmission output device 13. (The center axis of the slider 3 and the center axis of the transmission output device 13 are defined as the longitudinal centerlines of these elements.)

One end of the input device 11, the reflection output device 12 and the transmission output device 13 are engaged together at a point, and the input device 11 and the reflection output device 12 rotate around the point. An outer radius of the metal tube 117 of the input device 11 is equal to an inner radius a metal tube (not shown) of the reflection output device 12, so the metal tube 117 of the input device 11 is engaged into the metal tube of the reflective output device 12. The prism 2 is fixed at the point. In order to ensure light transmission between the input device 11 and the output devices 12, 13, a center axis of each of the input device 11 and the output devices 12, 13 are coplanar, therefore, the input fiber 111 and the output fibers 121, 131 are also coplanar where they connect into the optical switch 10.

The slider 3 is located on an angle bisector of the input device 11 and the reflection output device 12. The slider 3 defines a groove 32 and includes a wheel 31 engaged in the groove 32. The wheel 31 is movable in the groove 32 between a first and second ends of the groove 32. Two arms 33 of the slider 3 are rotatably attached to the wheel 31 at their inner ends. An outer end of each arm 33 rotatably engages with a gear 34 of the slider 3, said gears 34 respectively meshing with the racks 116 mounted on the plates 115 attached to the input device 11 and on the reflection output device 12. The gears 34 move in the racks 116 and respectively rotate around joint points of the gears 34 and the arms 33 while the wheel 31 moves in the groove 32 of the slider 3. The two arms 33 have a same length to ensure that an angle between the input device 11 and the center axis of the slider 3 is substantially equal to an angle between the center axis of the slider 3 and the reflection output device 12. When the wheel 31 is positioned at a first end of the groove 32 (Ref. FIG. 1A), a pre-determined angle is defined between the input device 11 and the reflection output device 12. When the wheel 31 is positioned a second end of the groove 32 (Ref. FIG. 1B), a different predetermined angle is defined between the input device 11 and the reflection output device 12, said angle being equal to or larger than an angle coinciding with the all-reflection condition of the prism 2.

Also referring to FIGS. 3A–4B, the prism 2 can be in the shape of a semi-circle, a triangle, or another shape. The prism 2 has a reflective surface 21 which is fixed perpendicular to the center axis of the slider 3. The input device 11 and the reflection output device 12 are disposed at a front side of the reflective surface 21 of the prism 2, and the transmission output device 13 is disposed at a rear side of the reflective surface 21 of the prism 2. The reflective surface 21 is coated with an optical film to ensure good optical performance of the reflective surface 21 of the prism 2.

Referring to FIGS. 3A and 3B, optical paths of the optical switch having a semi-circular prism are disclosed. In a first state, when the wheel 31 of the slider 3 is located at the first end of the groove 32 (FIG. 1A), the input device 11 and the reflection output device 12 have a predetermined angle defined therebetween. The input light beam 51 from the input device 11 is incident on the reflective surface 21 of the prism 2 at an angle $\theta_1$, and almost all light passes through the reflective surface 21 due to the film coating on the reflective surface 21 (FIG. 3A). The transmitted light beam 53 transmits to the transmission output device 13. When the wheel 31 moves in the groove 32, an angle between the input device 11 and the reflection output device 12 is changed. When the wheel 31 reaches the second end of the groove 32 (FIG. 1B), a largest angle is defined between the input device 11 and the reflection output device 12. In this position, Referring to FIG. 3B, the input light beam 51 is incident on the reflective surface 21 of the prism 2 at an angle $\theta_2$, which is equal to or larger than the critical angle determined by the refractive index of the reflective surface 21. The input light beam 51 is totally reflected by the reflective surface 21 of the prism 2, and the reflected light beam 52 is transmitted to the reflection output device 12.

Referring to FIGS. 4A and 4B, optical paths of the optical switch 10 having a triangular-shaped prism 2 are disclosed. The operation principle is substantially identical to that of the optical switch 10 with a semi-circular prism 2.

Figure 2A:
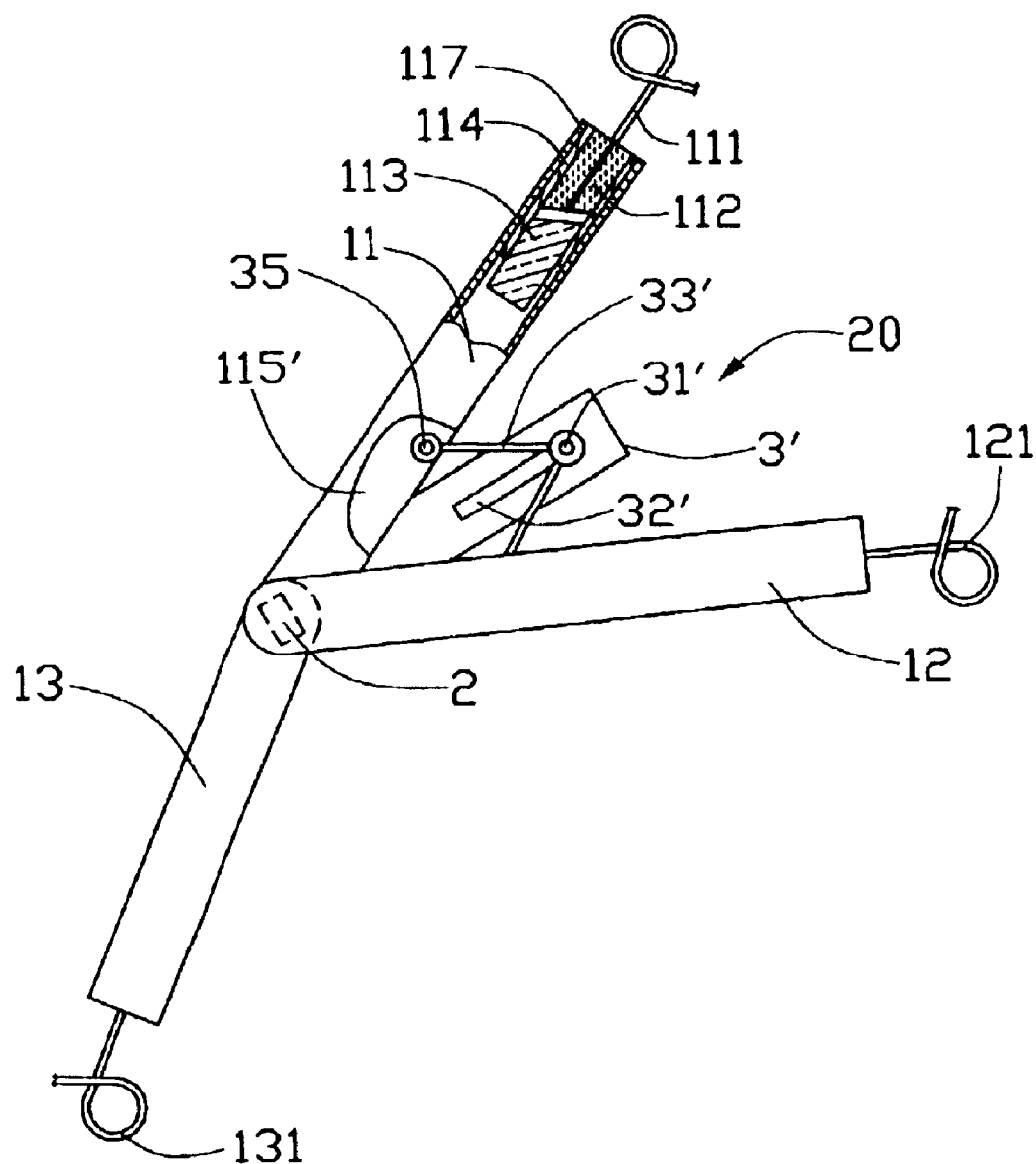
FIG. 2A and FIG. 2B are schematic top views of an optical switch in accordance with a second embodiment of the present invention, partially cut away, wherein the optical switch is respectively at a first state and at a second state.
Figure 2B:
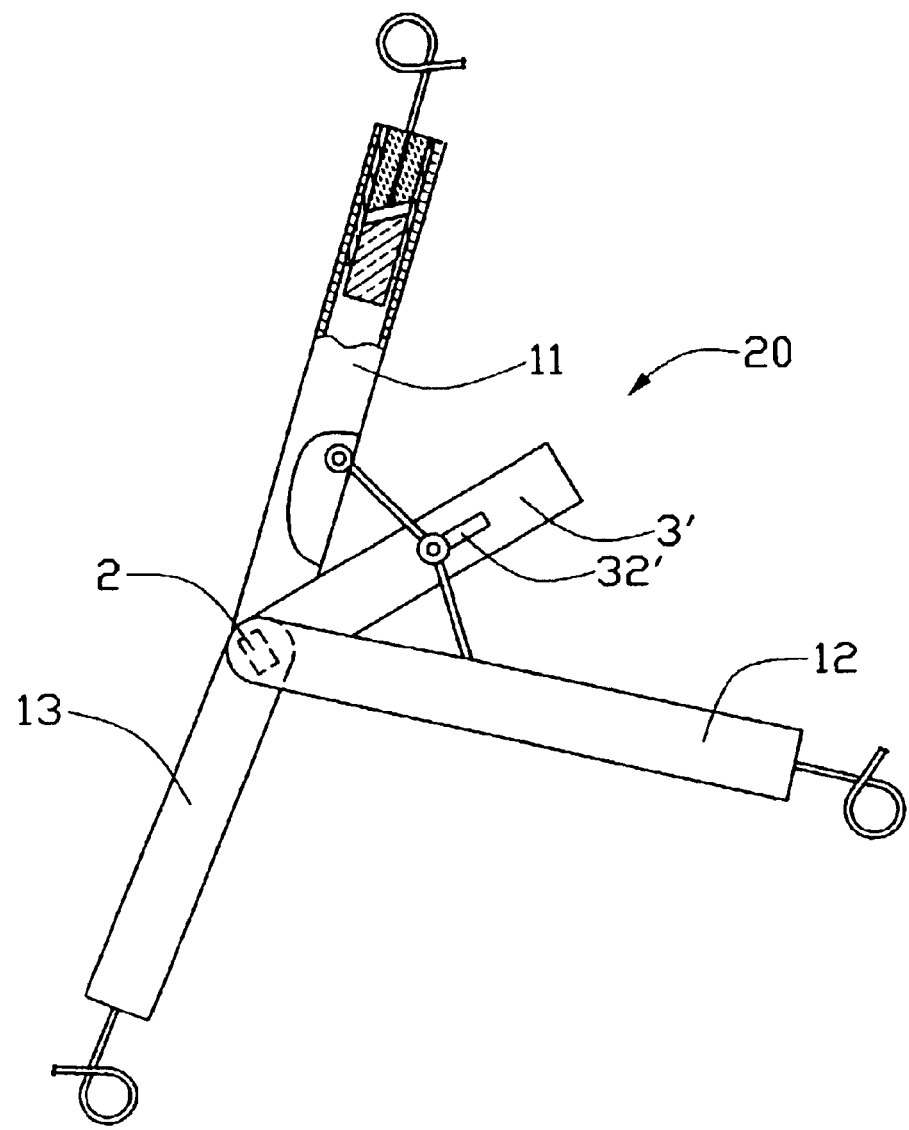

Referring to FIGS. 2A and 2B, a second embodiment of an optical switch 20 according to the present invention is shown. The optical switch 20 is almost identical to the optical switch 10, and comprises an input device 11, a reflection output device 12, a transmission output device 13, a prism 2 and a slider 3'. The input device 11 and the reflection output device 12 respectively mount a plate 115'. A shaft 35 protrudes from each plate 115' mounted on the input device 11 and the reflection output device 12. An outer end of each arm 33' of the slider 3' is rotatably connected with a corresponding shaft 35.

Figure 5A:
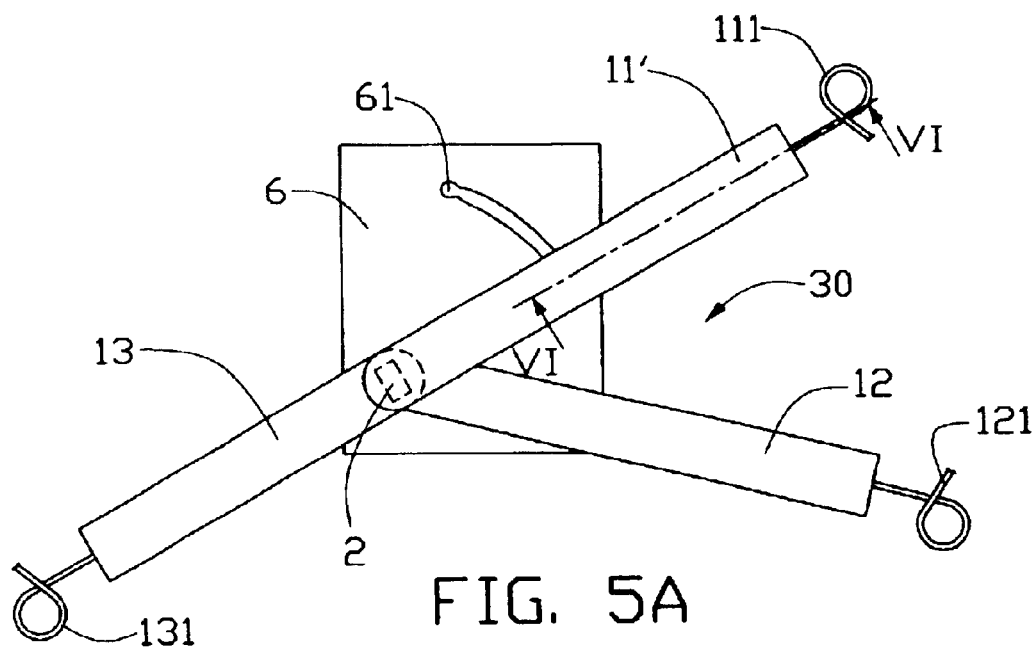
FIG. 5A and FIG. 5B are schematic top views of an optical switch in accordance with a third embodiment of the present invention, wherein the optical switch is respectively at a first state and at a second state.
Figure 5B:
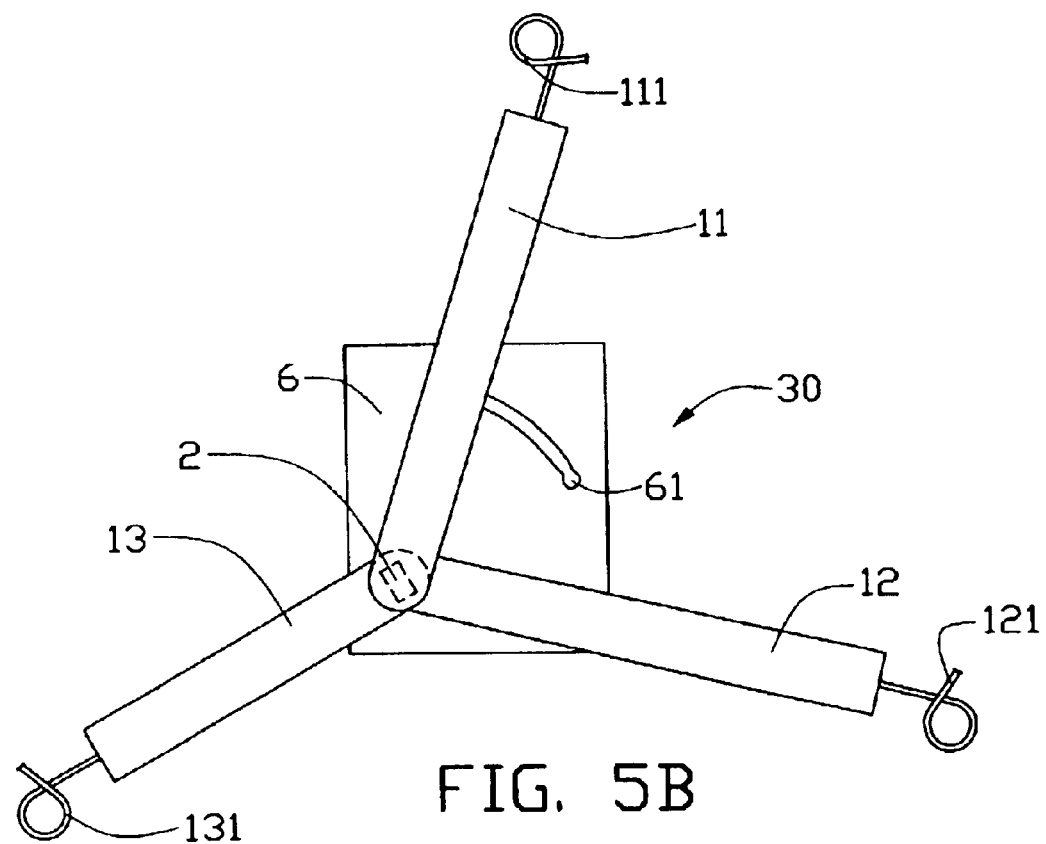

Referring to FIGS. 5A and 5B, a third embodiment of an optical switch 30 according to the present invention is shown. The optical switch 30 comprises an input device 11', a reflection output device 12, a transmission output device 13, a prism 2 and an adjustment plate 6. Input light signals from the input device 11' are output through the transmission output device 13 in a first state (FIG. 5A), while they are output through the reflection output device 12 in a second state (FIG. 5B).

The reflection output device 12, the transmission output device 13, and the prism 2 are all fixed relative to the plate 6, and the input device 11' is rotatable on the plate 6 around the prism 2. Also referring to FIGS. 7A–8B, the prism 2 has a reflective surface 21 for switching light paths. The reflective surface 21 is coated with an optical film to ensure good optical performance of the reflective surface 21. When the optical switch 30 is in the first state (FIG. 5A), the input device 11' aligns with the transmission output device 13. Input light beams 51 from the input device 11' transmit through the prism 2 and are transmitted through the transmission output device 13 as transmitted light beams 53. When the optical switch 30 is in the second state, the input device 11' is located at a position which is the mirror image of that of the reflection output device 12, relative to an axis perpendicular to the reflective surface 21 of the prism 2 (FIG. 5B). Input light beams 51 from the input device 11' are totally reflected by the prism 2 and are transmitted to the reflection output device 12 as reflected light beams 52.

Figure 6:
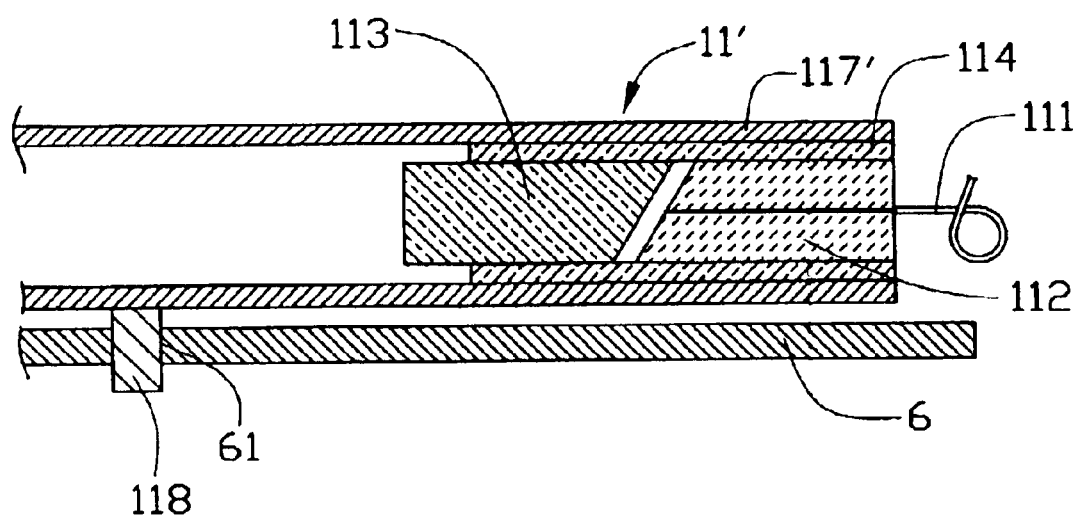
FIG. 6 is a cross-sectional view of an input device of the optical switch of FIGS. 5A and 5B, taken along line VI—VI of FIG. 5A.
Figure 9A:
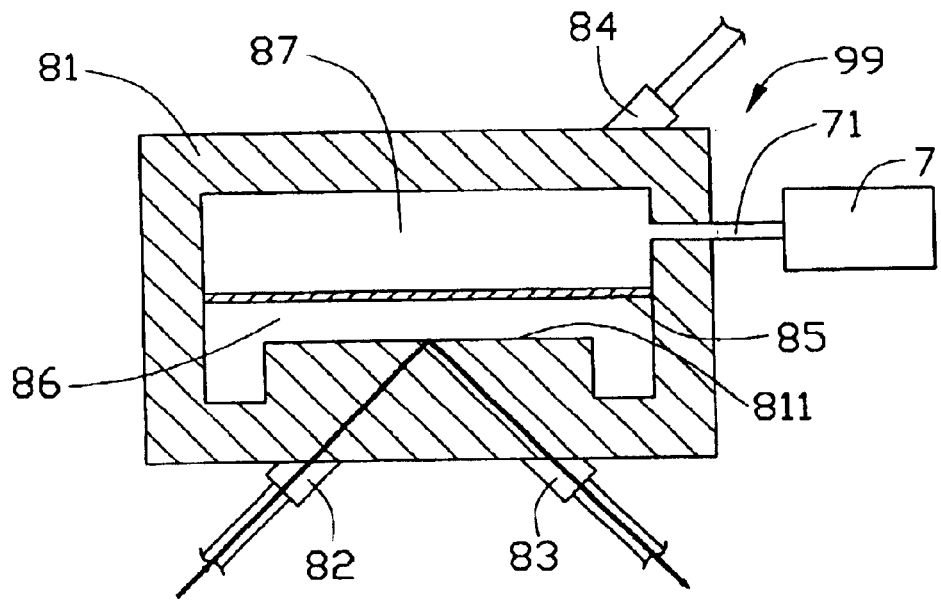
FIG. 9A and FIG. 9B are cross-sectional views of a conventional optical switch, wherein the optical switch is respectively at a first state and at a second state.
Figure 9B:
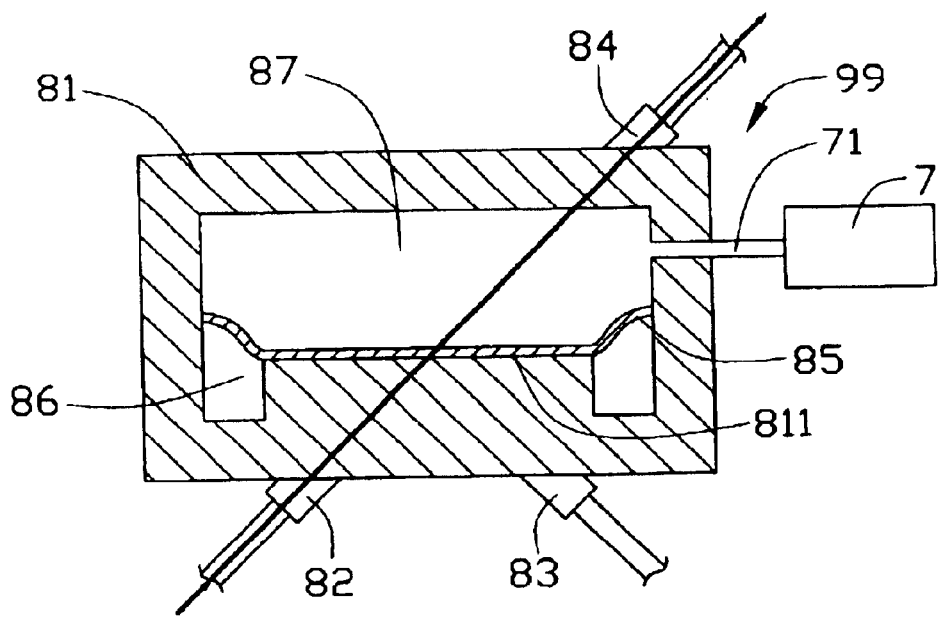

Also referring to FIG. 6, the input device 11' of the third embodiment comprises a ferrule 112 with an input optical fiber 111 and a collimator 113 for collimating the input light from the input optical fiber 111. The ferrule 112 and the collimator 113 are fixed in a quartz tube 114. A metal tube 117' is fixed over the quartz tube 114 to protect the quartz tube 114. The metal tube 117' is attached to the adjustment plate 6. A rod 118 protrudes from an outside surface of the tube 117'. An arc-shaped groove 61 is defined through the adjustment plate 6 for accommodating the rod 118 of the tube 117'. A pair of tongs (not labeled) made of an elastic material project from the adjustment plate 6 into the arc-shaped grove 61, close to each end of the groove 61. These tongs form slight constrictions near the ends of the grooves 61, so the rod 118 can be fixed at either of two ends of the arc-shaped groove 61.

The prism 2 can be a semi-circular prism, a trapeziform prism, or can take other shapes. Referring to FIGS. 7A and 7B, optical paths of the optical switch with a semi-circular prism are disclosed. In a first state (FIG. 7A), when the input device 11' is located at a first end of the arc-shaped groove 61, the input light beam 51 from the input device 11' is incident perpendicularly on the reflective surface 21 of the prism 2. Almost all light of the input light beam 51 passes through the reflective surface 21, and the transmission light beam 53 is output through the transmission output device 13. When the input device 11' is rotated to the second end of the groove 61, the input light beam 51 is incident on the reflective surface 21 of the prism 2 at an angle $\theta_2$, which is equal to or larger than the critical angle determined by the refractive index of the reflective surface 21. The input light beam 51 is totally reflected by the reflective surface 21 of the prism 2, and the reflected light beam 52 is output through the reflection output device 12.

Referring to FIGS. 8A and 8B, optical paths of the optical switch 30 having a trapeziform prism are disclosed. The operation principle is substantially identical to that of the optical switch 30 with a semi-circular prism.

Compared with the conventional optical switch, the optical switch of the present invention realize optical switch by mechanics, and all elements of the optical switch are enclosed in tubes. No impurity locates between each port to effect optical performance. Additionally, no liquid is located in the optical switch, the optical switch doesn't need have perfect seal, and thus reduce the cost of the optical switch.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. An optical switch for switching light paths coming from an input port between a transmission and a reflection output ports, comprising:

a prism having a reflective surface for switching optical paths;

a rotation device allowing at least the input port to rotate around the prism between a first position and a second position;

wherein, an angle of incidence of an input light beam from the input port on the reflective surface changes with the rotation of the input port, and the input port rotates between a first position, wherein the angle of incidence is less than a critical angle of the reflective surface and therefore the input light beam passes through the reflective surface of the prism and is output through the transmission output port, and a second position, wherein the angle of incidence is larger than or equal to the critical angle of the reflective surface and therefore the input light beam is totally reflected by the reflective surface and is output through the reflection output port.

2. The optical switch in accordance with claim 1, wherein the input port, the reflection output port and the transmission output port each have an optical fiber.

3. The optical switch in accordance with claim 2, wherein the optical fibers of the input port, the reflection output port and the transmission output port are coplanar.

4. The optical switch in accordance with claim 1, wherein the reflective surface of the prism is coated with an optical film.

5. The optical switch in accordance with claim 1, wherein the reflection output port and the input port are symmetrically located at two sides of the rotation device.

6. The optical switch in accordance with claim 5, wherein the rotation device assures synchronous rotation of the input port and the reflection output port around the prism.

7. The optical switch in accordance with claim 1, wherein the rotation device has a groove which is perpendicular to the reflective surface of the prism, and the groove has a first end and a second end.

8. The optical switch in accordance with claim 7, wherein a wheel is located in the groove of the rotation device, and the wheel has at least an arm connecting with the input port.

9. The optical switch in accordance with claim 8, wherein the wheel is movable in the groove between the first end and the second end, and when the wheel is at the first end of the groove, at least the input port is at a first position, while when the wheel is at the second end of the groove, at least the input port is at a second position.

10. The optical switch in accordance with claim 9, wherein at least the input port has a rack defined thereon.

11. The optical switch in accordance with claim 10, wherein an end of the arm of the wheel has a gear meshing with the rack of the input device.

12. The optical switch in accordance with claim 1, wherein said transmission output port is fixed while said reflection output port is either fixed or rotatable along with the input port in an opposite direction.

13. An optical switch comprising:

an input device with an input optical fiber;

a first output device with a first output optical fiber;

a second output device with a second output optical fiber;

a switch element having a reflective surface for switching optical paths; and a slider having a moving portion movable between a first position and a second position, the moving portion having two arms respectively connecting with the input device and the first output device, the first and second positions of the moving portion respectively corresponding to a first and second positions of the input device and the first output device, the input device and the first output device being symmetrically located at two sides of the slider, the slider assuring synchronous movement of the input device and the first output device when said input and first output devices are rotated around the switch element;

wherein, when the input device and the first output device are at a first position, an input light beam from the input device is incident on the reflective surface of the switch element at an angle which is less than a critical angle determined by the refraction index of the prism and so the input light beam passes through the reflective surface of the prism and is output through the second output device, and when the input device and the first output device are at a second position, the angle of incidence of the input light beam on the reflective surface is equal to or larger than the critical angle, and so the input light beam is totally reflected by the reflective surface and is output through the first output device.

14. The optical switch in accordance with claim 13, wherein the input optical fiber and the first and second output optical fibers are coplanar.

15. The optical switch in accordance with claim 13, wherein the switch element is a prism.

16. The optical switch in accordance with claim 15, wherein the prism is a semi-circular prism or a triangular prism.

17. The optical switch in accordance with claim 13, wherein the slider further comprises a groove which is perpendicular to the reflective surface of the switch element.

18. The optical switch in accordance with claim 17, wherein the moving portion slides in the groove of the slider.

19. The optical switch in accordance with claim 13, wherein the input device and the first output device are disposed at a front side of the reflective surface of the switch element, and the second output device is disposed at a rear side of the reflective surface of the switch element.

20. The optical switch in accordance with claim 13, wherein a rack is fixed on each of the input device and the first output device, a gear is rotatably engaged with an end of each of the two arms of the moving portion of the slider, and the gears correspondingly mesh with the racks.

21. The optical switch in accordance with claim 20, wherein the input device and the first output device further respectively comprise a mounting portion with the rack fixed thereon.

22. The optical switch in accordance with claim 21, wherein the input device and the first output device each has a shaft which respectively connect with a corresponding one of the two arms of the moving portion of the slider.

23. The optical switch in accordance with claim 22, wherein the input device and the first output device further respectively comprise a mounting portion from which the shaft projects.

24. An optical switch comprising:

an input device with an input optical fiber;

a first output device having a first output optical fiber;

a second output device having a second output optical fiber; and a switch element having a reflective surface for realizing optical path switching;

wherein, the first and second output devices are fixed around the switch element, the input device is mounted on a substrate and is rotatable between a first position and a second position, and when the input device is at the first position, light signals from the input device are transmitted to the first output device through the reflective surface of the switch element, and when the input device is at the second position, light signals from the input device are reflected to the second output device by the reflective surface of the switch element.

25. The optical switch in accordance with claim 24, wherein the substrate has an arc-shaped groove with two ends respectively corresponding to the first and second positions of the input device.

26. The optical switch in accordance with claim 25, wherein the input device further comprises a rod portion which is movably engaged in the arc-shaped groove of the substrate.

27. The optical switch in accordance with claim 26, wherein a pair of tongs made of an elastic material project from the substrate into the arc-shaped groove, close to each end of the groove, to form a slight constriction near each end of the groove for removably fixing the rod at either end of the groove.

28. The optical switch in accordance with claim 24, wherein the first and second output devices are fixed to a plate.

* * * * *